US007468955B2

(12) United States Patent
Esfandiari

(10) Patent No.: US 7,468,955 B2
(45) Date of Patent: Dec. 23, 2008

(54) SYSTEM AND METHOD OF DEFINING A MODIFIED UPSR SONET NETWORK INCLUDING SUB-TENDING RINGS

(75) Inventor: Mehran Esfandiari, Oakland, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 645 days.

(21) Appl. No.: 11/103,652

(22) Filed: Apr. 11, 2005

(65) Prior Publication Data

US 2006/0227791 A1 Oct. 12, 2006

(51) Int. Cl.
*H04L 12/28* (2006.01)
*H04L 12/50* (2006.01)
*H04L 12/56* (2006.01)

(52) U.S. Cl. .................. 370/254; 370/255; 370/258; 370/376; 370/395.51

(58) Field of Classification Search .................. 370/258
See application file for complete search history.

(56) References Cited

U.S. PATENT DOCUMENTS

| 5,515,367 | A  | * | 5/1996  | Cox et al. ................... 370/404 |
| 6,061,335 | A  | * | 5/2000  | De Vito et al. .............. 370/258 |
| 6,389,015 | B1 | * | 5/2002  | Huang et al. ................ 370/376 |
| 6,768,745 | B1 |   | 7/2004  | Gorshe et al. |
| 6,798,752 | B1 | * | 9/2004  | Pope .......................... 370/254 |
| 6,892,169 | B1 | * | 5/2005  | Campbell et al. .............. 703/1 |
| 7,133,403 | B1 | * | 11/2006 | Mo et al. .................... 370/390 |
| 7,263,290 | B2 | * | 8/2007  | Fortin et al. .................... 398/58 |
| 2001/0019540 | A1 | * | 9/2001 | Uematsu et al. .............. 370/258 |
| 2002/0036988 | A1 | * | 3/2002 | Cardwell et al. ............. 370/238 |
| 2003/0177213 | A1 | * | 9/2003 | Wallace et al. .............. 709/223 |
| 2004/0120270 | A1 | * | 6/2004 | Saxon et al. ................. 370/258 |
| 2005/0095008 | A1 | * | 5/2005 | DeCusatis et al. ........... 398/164 |

OTHER PUBLICATIONS

Johnson, D.S. et al., "Worst-case performance bounds for simple one-dimensional packing algorithms", SIAM J. Comput., vol. 3, No. 4, Dec. 1974, pp. 299-325.*

* cited by examiner

*Primary Examiner*—Daniel J Ryman
*Assistant Examiner*—Cassandra Decker
(74) *Attorney, Agent, or Firm*—Toler Law Group

(57) ABSTRACT

A method of providing a data file that defines a modified SONET ring network including at least one sub-tending ring is disclosed. The method comprises identifying a set of low data rate sub-tending ring candidate traffic handling elements within a SONET ring network to be modified. For a first candidate element of the set of low speed sub-tending ring candidate traffic handling elements, the method includes evaluating selected characteristics of a first parent SONET UPSR ring with respect to adding the first candidate element sub-tending SONET ring. Based on a positive evaluation of each of the selected characteristics of the parent SONET ring, the method includes creating a data model that indicates addition of the first and subsequent candidate element sub-tending SONET ring to the parent SONET ring, and providing a data file based on the data model that defines a modified SONET ring network including the parent SONET ring(s) and the sub-tending SONET rings.

23 Claims, 3 Drawing Sheets

SYSTEM AND METHOD OF DEFINING A MODIFIED UPSR SONET NETWORK INCLUDING SUB-TENDING RINGS

FIELD OF THE DISCLOSURE

The present disclosure relates to modifying a SONET network to include sub-tending rings.

BACKGROUND

Synchronous optical networks (SONET) have been around for many years. In recent years methods for designing both unidirectional path switch ring (UPSR) and bilateral switch ring (BLSR) type SONET networks have been developed, and some of these methods have been implemented using software tools for mechanizing designs. With the development of Next Generation SONET (NGSONET), new features and capabilities have been added to SONET add-drop multiplexers (ADMs). Sub-tending rings are one of these new features. A typical SONET network in a major metro area can have hundreds of UPSR elements and different ring speeds. High-speed rings, traditionally designated as OC192 rings, can also have a sub-tending ring attached to the rings. The "Sub-tending Ring" feature allows a higher bit rate ring to act as a node on a lower bit rate ring. Thus, the same ADM can function as a node on multiple rings with different bit rates. For example a node on an OC192 ring can also have a sub-tending OC48 ring attached to it. The design of sub-tending rings on a parent ring is a new challenge and conventional systems do not adequately provide a systematic design of sub-tending rings in a metro network environment.

Accordingly, there is a need for an improved method and system of developing SONET ring networks with sub-tending rings.

DETAILED DESCRIPTION OF THE DRAWINGS

A method of providing a data file that defines a modified SONET ring network including at least one sub-tending ring is disclosed. The method comprises identifying a set of low data rate sub-tending ring candidate traffic handling elements within a SONET ring network to be modified. For a first candidate element of the set of low speed sub-tending ring candidate traffic handling elements, the method includes evaluating selected characteristics of a first parent SONET ring having an associated sub-tending SONET ring with respect to adding the first candidate element to the parent SONET ring. Based on a positive evaluation of each of the selected characteristics of the parent SONET ring, the method includes creating a data model that indicates addition of the first candidate element to the parent SONET ring and associated sub-tending SONET ring(s), and providing a data file based on the data model that defines a modified SONET ring network including the parent SONET ring and the sub-tending SONET ring(s) which includes the first candidate element. A computer system to execute a software program and a computer readable medium to store the software program is also disclosed. The software program includes logic to implement the disclosed method.

Figure 1:
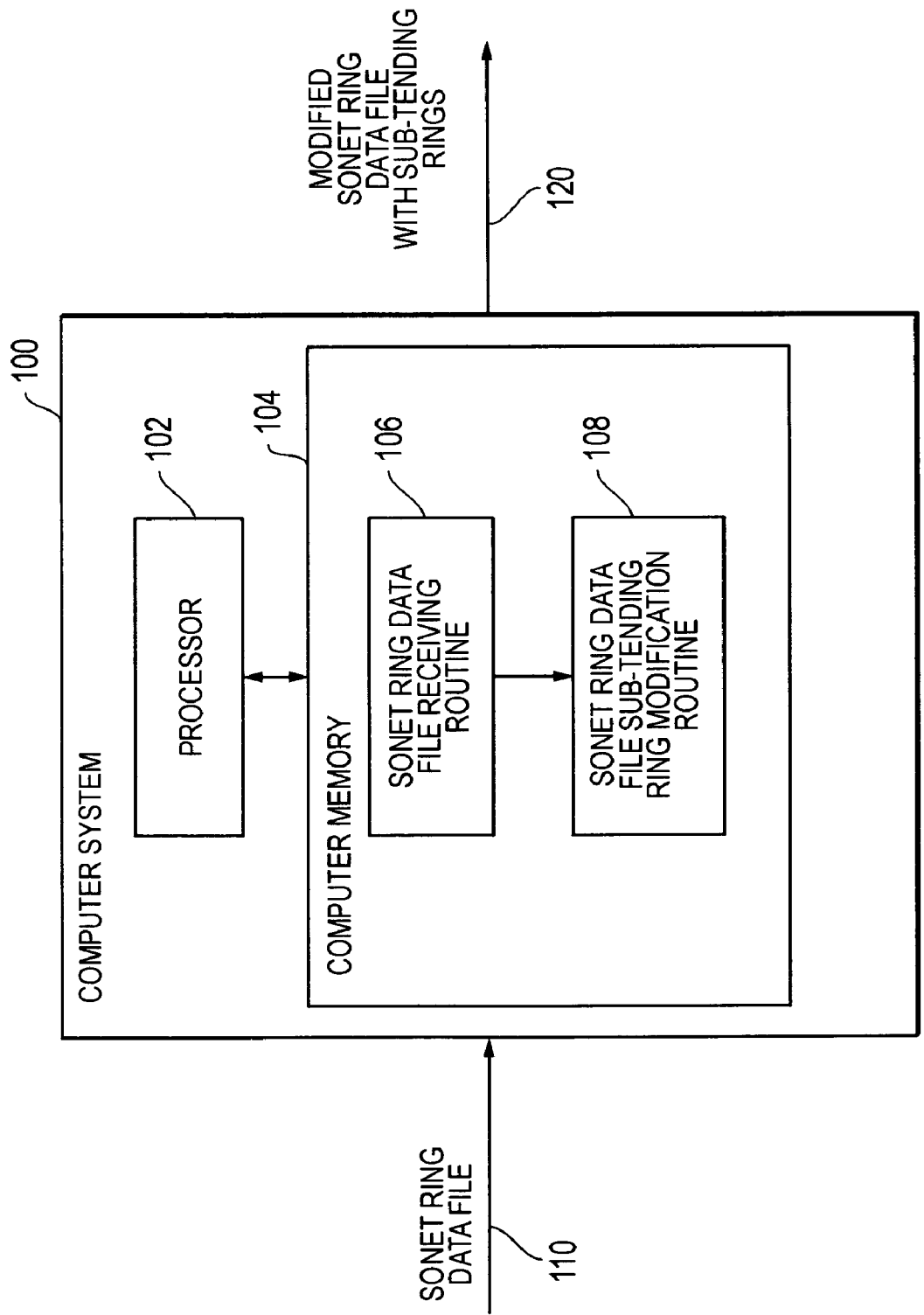
FIG. 1 is a block diagram of a computer system that may execute a software routine to modify a SONET network to add sub-tending rings.

Referring to FIG. 1, a network management computer system 100 is shown. The computer system 100 includes a processor 102 and a computer readable memory 104. The computer memory 104 includes software programs such as a first software routine 106. The first software routine 106 is a SONET ring data file receiving routine. The computer memory 104 also includes a second software routine 108 that is a SONET ring data file sub-tending ring modification routine. The computer system 100 has an input to receive a SONET ring data file 110 and has an output to provide a modified SONET ring data file 120. The modified SONET ring data file 120 represents a SONET ring network that has sub-tending rings.

During operation, a SONET ring data file 110 that defines and is representative of a SONET ring network is provided to the computer system 100 and is received at the SONET ring data file receiving routine 106. The SONET ring data file receiving routine 106 processes the SONET ring data file 110 and provides processed data to the SONET ring data file sub-tending ring modification routine 108. The SONET ring data file sub-tending ring modification routine 108 includes logic in the form of program instructions that are executable by processor 102 to analyze and identify network elements within the SONET ring network that may be suitable for addition of a sub-tending ring. The specific logic and sequence of method steps that may be used by the SONET ring data file sub-tending ring modification routine 108 are further described with reference to FIGS. 2 and 3.

The result of executing the SONET ring data file sub-tending ring modification routine 108 by the processor 102 is to provide as an output a modified SONET ring data file with sub-tending rings 120. The modified SONET ring data file including the sub-tending rings 120 may be provided by the computer system 100 to a display device such as an operator workstation or console to provide a view of the modified and enhanced SONET network including sub-tending rings. In a particular embodiment, the display device may be a printer or display terminal that may be coupled to the computer system 100 via an intermediate network. For example, the computer system 100 may be a server computer on a shared network and a remote computer terminal may receive and display the modified SONET ring data file 120 or a graphical representation thereof may be presented to a network operator tasked with management of SONET ring network systems.

Figure 2:
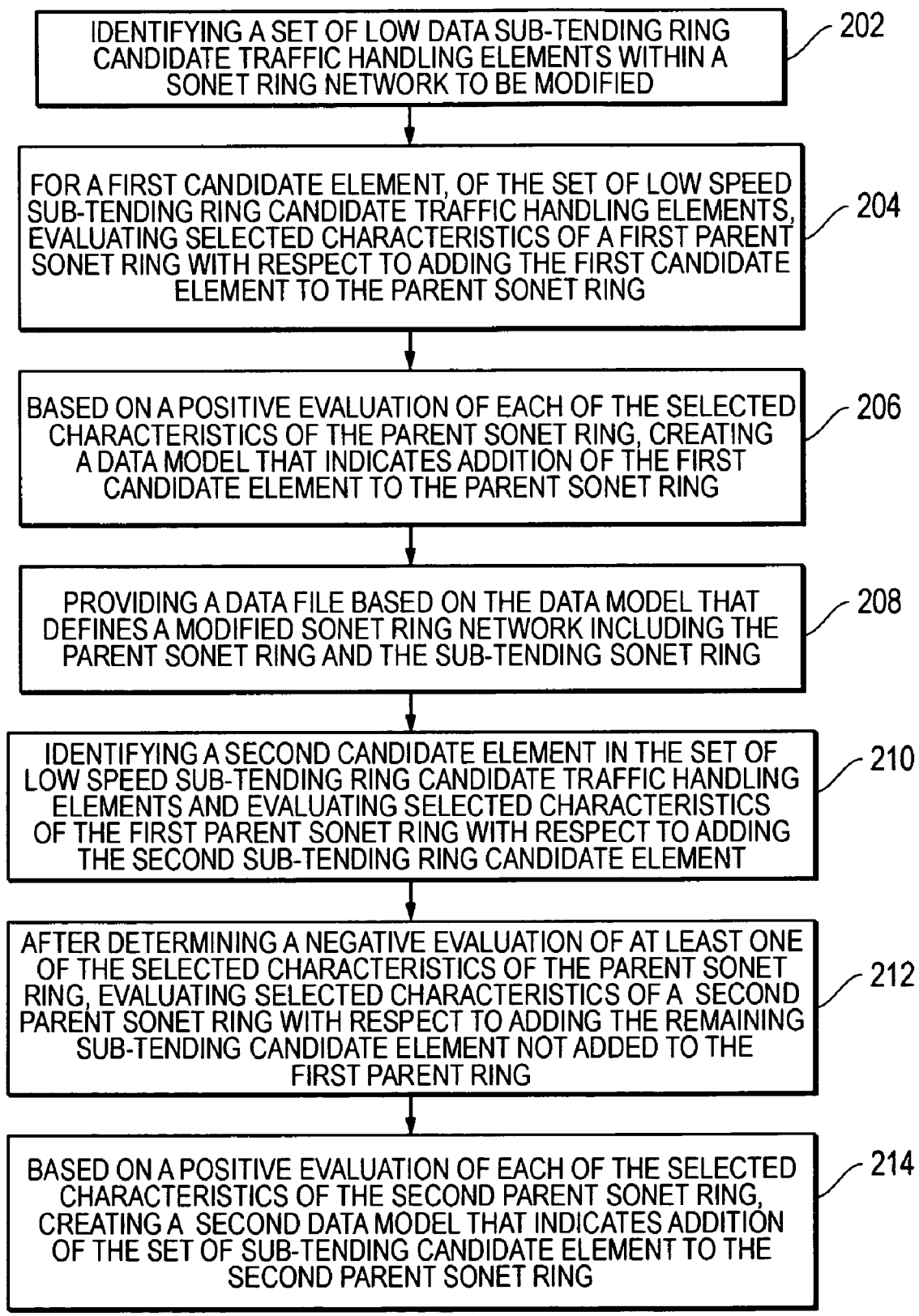
FIG. 2 is a flow chart that depicts a method of modifying a data file defining a SONET ring network to add sub-tending rings.

Referring to FIG. 2, a method of providing a data file that defines a modified SONET ring network including at least one sub-tending ring is shown. The method includes identifying a set of low data rate sub-tending ring candidate traffic handling elements within an existing SONET ring network that is to be modified, at 202. For a first candidate element, as shown at 204, in the set of low speed sub-tending ring candidate traffic handling elements, the method includes evaluating selected characteristics of a first parent SONET ring with respect to adding the first candidate element to the parent SONET ring. This method step is shown at 204.

Referring to step 206, based on a positive evaluation of each of the selected characteristics of the parent SONET ring, the method includes creating a data model that indicates addition of the first candidate element to the parent SONET ring. The method further includes providing a data file based on the data model that defines the modified SONET ring network including the parent SONET ring and the newly added sub-tending SONET ring, i.e. the first candidate element, as shown at 208.

In a particular embodiment, the method further includes identifying a second candidate element in the set of low speed sub-tending ring candidate traffic handling elements and evaluating selected characteristics of the first parent SONET ring with respect to adding the second sub-tending ring candidate element to the parent SONET ring, as shown at 210. This process can continue for the third or more sub-tending ring candidates. After determining a negative evaluation of at least one of the selected characteristics of the parent SONET ring, the method proceeds to evaluate selected characteristics of a second parent SONET ring with respect to adding the remaining subtending candidate element not added to the first parent ring, as shown at 212. Based on a positive evaluation of each of the selected characteristics of the second parent SONET ring, the method creates a second data model that indicates addition of the set of subtending candidate element to the second parent SONET ring, as shown at 214.

The method proceeds through a group of parent SONET ring candidates to identify traffic handling elements in such parent SONET ring candidates where sub-tending rings may be added. In addition, after a first group of SONET ring parent network rings have been evaluated, the method may include proceeding to a second group of parent SONET rings that may be evaluated for addition of sub-tending SONET rings. While the above disclosed and described method of adding sub-tending SONET rings to parent SONET rings has been described sequentially, it should be understood that these method steps are not in a particular order and that various sequences of evaluating SONET ring network elements may be provided. In addition, in a particular embodiment, the method described with respect to FIG. 2 may be implemented by a software program that performs an automated or semi-automated routine executed by a processor within a computer system, as shown with respect to FIG. 1.

The methods described pertain to any set of low-speed SONET systems subtending on a higher speed parent Unidirectional Path Switch Ring (UPSR). SONET system. Typical SONET bit rates for systems are OC192, OC48, OC12 and OC3 but not limited to these rates. As an example an OC192 can act as the parent ring and OC48, OC12, OC3 or other low-speed systems can be the subtending ring candidates. In a particular embodiment, the selected characteristics of a first parent SONET ring may include a physical port switch characteristic, a transfer port characteristic, or a span control capacity of an operating and support system (OSS) characteristic. In a particular exemplary embodiment, the first candidate element may be an element of an OC-3 ring and a second candidate element may be an element of an OC-12 ring. Optionally, the first parent in a particular illustrated embodiment may be a first OC-192 SONET ring and the second parent may be a second OC-192 ring. In this example, the first parent ring and the second parent ring are both within the same SONET network. Optionally, the first and second parent rings may be within different groups of SONET rings and may be within separate SONET networks to be modified with sub-tending rings, or the first set of parent rings could be OC192 SONET rings, and the second set of parent ring could be OC48 SONET rings. In this method, the parent SONET ring is a unidirectional path switch ring (UPSR). Also, in a particular embodiment of the method described with respect to FIG. 2, the method may include a step of determining that a particular parent SONET ring has no further capacity and then identifying a second parent ring that is within the first group of OC-192 rings as applicable to capacity limitations on unidirectional path switch rings. In addition, the method may determine that a last candidate in the set of candidates has been processed and then proceed to select a second group of OC-192 UPSR rings to process for further sub-tending ring selection.

In a particular illustrative embodiment, the candidates may be selected from a set of candidates based on particular selection criteria. For example, the selection criteria may include selecting traffic handling elements that are poorly routed, or that have inefficiently filled rings. Lower speed rings may be given priority over higher speed rings and priority may be given to rings having a larger number of nodes over those with a lower number of nodes. In addition, criteria candidate selection may be based on the N−1 rule where N-node low speed systems having rings with N−1 common nodes are selected to have priority as candidates of being sub-tending rings.

In a particular embodiment, the logic for performing the method described in FIG. 2 may be implemented by computer instructions that are within a computer readable memory such as the computer memory 104 as illustrated in FIG. 1. In addition, the program instructions may be stored in any computer readable storage medium, such as a hard drive, CD-ROM, or other type of computer readable storage device. In addition, while the computer software routines have been shown as stored within a single computer system 100, it should be understood that the software routines may be distributed to various computer systems such as those found on a local area network or a wide area network and multiple computer systems may have access to execution of the sub-tending ring modification routine as described herein.

Figure 3:
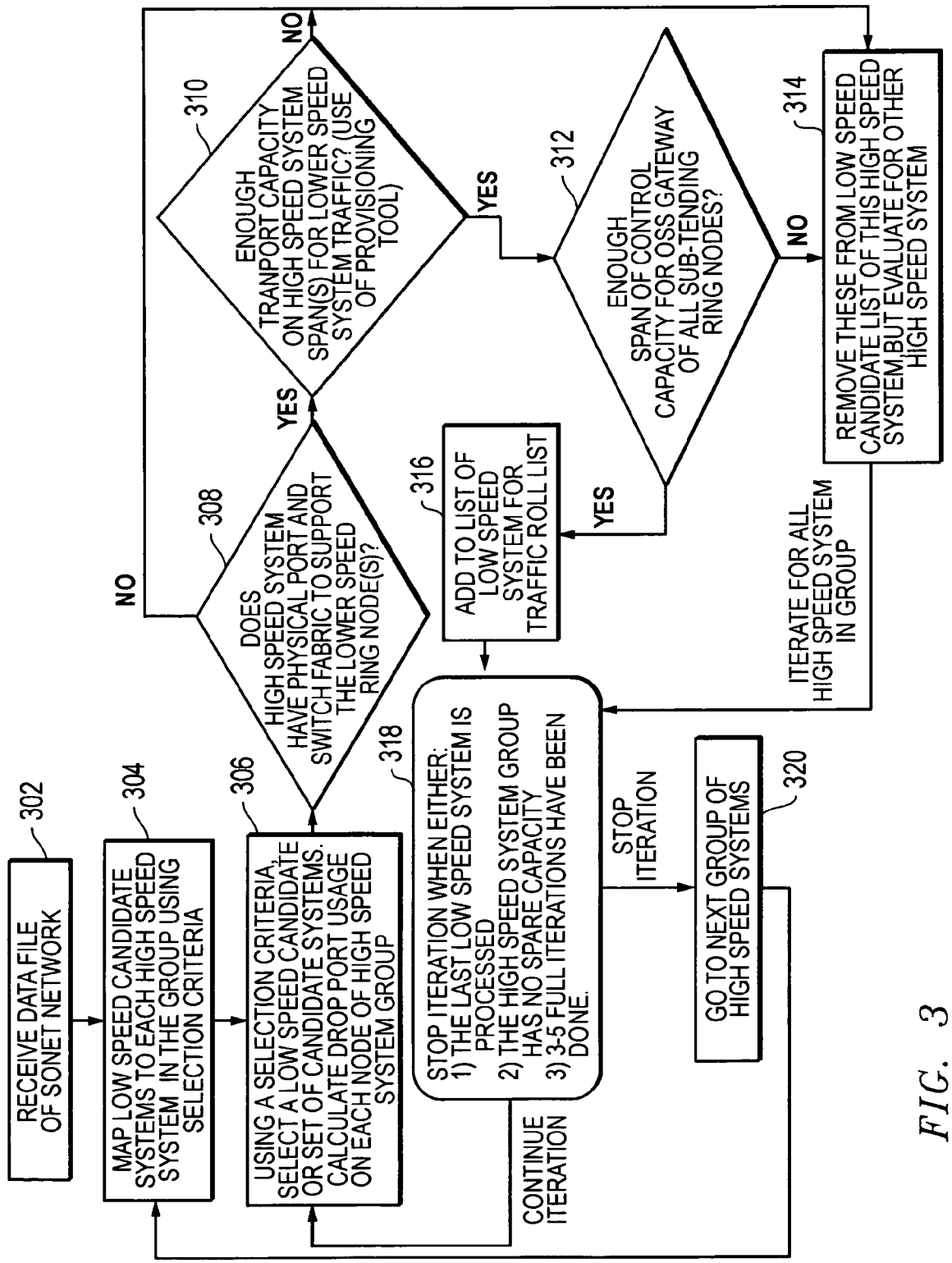
FIG. 3 is a flow chart that illustrates a particular embodiment of a method of modifying a data file representing a SONET ring network to add sub-tending rings.

Referring to FIG. 3, a detailed method of modifying a SONET ring data file to produce an enhanced SONET ring data file having sub-tending rings is shown. The method includes receiving a data file of a defined SONET network having candidate SONET network rings, as shown at 302. The method includes mapping low speed candidate systems to each high-speed UPSR ring in a group of rings using a selection criteria, as shown at 304. In the example in FIG. 3 the method using a set of OC192 UPSR SONET systems as the parent rings are shown. The methods described herein also apply to OC48 or OC12 or other bit rate systems acting as the parent UPSR SONET system (not shown in FIG. 3.) Examples of the selection criteria and prioritization for low speed candidate systems includes identifying poorly routed (e.g. folded spans/segments, Asynchronous Fiber Optic systems, older technology rings, N−1 rule, inefficiently filled rings, lower speed ring prioritization, and poorly performing traffic patterns). The selection criteria may also include evaluating rings with larger number of nodes rather than smaller number of nodes, and other criteria designed to provide for a uniform/balanced port utilization at each High Speed UPSR SONET System node/span. A goal of the selection candidate prioritization method is to increase cost recovery of low span nodes versus high span nodes and to provide for reuse potential as available. The method further includes using the selection criteria to select low speed candidate elements or set-up candidate systems and to calculate the drop port usage for each node on an High Speed UPSR SONET System group (as an example, the OC-192 group, as shown at 306). At decision step 308, the OC-192 group is evaluated to determine if it has a physical port and switch fabric that would support adding a lower speed sub-tending ring.

If the decision step 308 indicates that no switch fabric is available, then the method proceeds to step 314 where the low speed candidate is removed from the list of the particular OC-192 ring and processing continues to evaluate other potential OC-192 rings. In this case, processing continues at step 318 where iteration is performed for each of the OC-192 rings in the selected candidate group. The iteration through OC-192 rings is stopped either when the last low speed system is processed, the OC-192 has no spare capacity, or after a set, such as a set of 3-5 full iterations, have been completed, as shown at 318.

After iteration is terminated, as shown at 318, processing of the iteration stops and a next group of OC-192 candidate rings is selected, as shown at 320. Thereafter, processing continues back at step 304 for the next group of OC-192 rings.

Referring again to decision step 308, where the physical port and switch pad fabric is available, then processing continues to decision step 310 where transport capacity for the OC-192 span ring is evaluated with respect to adding a lower speed system. The span and ring capacity criteria is based on OC192 UPSR capacity limitations. Where the transport capacity is not available, then processing continues at step 314 and proceeds as described above. Where transport capacity on the OC-192 span or the lower speed sub-tending ring is available, then processing continues to decision step 312 where span of control capacity for the OSS gateway supporting the sub-tending ring is evaluated.

Each of the sub-tending rings for each node is evaluated with respect to the OSS gateway span of control capacity. For example, sizing rules may be evaluated as well as other criteria within the OSS gateway. Where span of control capacity for the OSS gateway is available, then processing continues with the method, at step 316, where the candidate is added to a list of low speed systems and a traffic role list is created. The list of low speed system candidates and the traffic role list is provided for sub-tending ring addition to the SONET network and processing continues, as described above at step 318, where iteration is performed through additional OC-192 candidates.

Referring to decision step 312, where the OSS gateway does not have enough span of control capacity, then the candidate is not selected and processing continues at 314 where the low speed candidate is removed from the candidate list and iteration continues through other candidates, as shown at steps 318 and 306 and as described above.

With the system and method illustrated, a method and procedure has been disclosed to provide a step-by-step and systematic method to create and add sub-tending rings to previously existing SONET networks with UPSR parent rings. In addition, the disclosed system and method takes into account multiple parameters and selection criteria to add the sub-tending rings to existing SONET networks. The disclosed method provides for procedures that may be useful during a planning phase of sub-tending ring design application and also provides various practical criteria to address live network traffic considerations that may be faced by typical metropolitan network operators. In addition, the method may be implemented by an automated or semi-automated software tool to provide for reduced errors and increased efficiency of network design and management.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    identifying a set of traffic handling elements within a Synchronous Optical Network (SONET) ring network;
    for a first traffic handling element of the set of traffic handling elements, evaluating first selected characteristics of a first parent SONET ring with respect to adding the first traffic handling element to a sub-tending SONET ring of the first parent SONET ring;
    based on a positive evaluation of the first selected characteristics of the first parent SONET ring, creating a data model that adds the first traffic handling element to the first parent SONET ring;
    providing a data file based on the data model defining a modified SONET ring network including the first parent SONET ring and including the sub-tending SONET ring, wherein the first parent SONET ring includes the first traffic handling element, and wherein the sub-tending SONET ring includes the first traffic handling element.

2. The method of claim 1, further comprising:
    identifying a second traffic handling element of the set of traffic handling elements and evaluating the first selected characteristics of the first parent SONET ring with respect to adding the second traffic handling element to the sub-tending SONET ring;
    after determining a negative evaluation of at least one of the selected characteristics of the first parent SONET ring, evaluating second selected characteristics of a second parent SONET ring with respect to adding the second traffic handling element to the second parent SONET ring; and
    based on a positive evaluation of the second selected characteristics of the second parent SONET ring, creating a second data model that adds the set of traffic handling elements to the second parent SONET ring.

3. The method of claim 1, wherein the first selected characteristics of the first parent SONET ring include a physical port switch characteristic, a transport characteristic, and a span of control capacity of an operating and support system characteristic.

4. The method of claim 2, wherein the first traffic handling element is an element of a low data rate subtending ring and wherein the second traffic handling element is an element of another low data rate subtending ring.

5. The method of claim 1, wherein the first parent SONET ring is configured as a first unidirectional path switched ring (UPSR).

6. The method of claim 2, wherein the second parent SONET ring is configured as a second unidirectional path switch ring (UPSR).

7. The method of claim 1, wherein the first parent SONET ring is configured to act as a node of the subtending SONET ring.

8. The method of claim 1, further comprising determining that the first parent SONET ring has no further capacity and identifying a second parent SONET ring from a first group of parent rings.

9. The method of claim 8, further comprising:
    determining that a last traffic handling element in the set of traffic handling elements has been processed; and
    selecting a second group of parent rings to add a sub-tending ring to.

10. The method of claim 1, wherein the traffic handling elements are selected from the set of traffic handling elements based on at least one of poorly routed elements given priority, inefficiently filled rings given priority, lower speed rings with priority over higher speed rings, a large number of node rings with priority over lower number of node rings, and the N−1 rule.

11. A computer system comprising:
   a computer processor device to execute a software program stored in a computer readable memory, the software program comprising:
   a first routine to receive a first data file that defines a synchronous optical network (SONET) ring network;
   a second routine responsive to the first routine, the second routine to modify the first data file to create a second data file that defines a modified SONET ring network including at least one sub-tending ring, the second routine including logic to:
      identify a set of traffic handling elements within the SONET ring network;
      for a first traffic handling element of the set of traffic handling elements, evaluate first selected characteristics of a first parent SONET ring with respect to adding the first traffic handling element to a sub-tending SONET ring of the first parent SONET ring;
      based on a positive evaluation of each of the first selected characteristics of the first parent SONET ring, the second routine to create a data model wherein a first candidate is added to the sub-tending SONET ring and added to the first parent SONET ring; and
   provide the second data file based on the data model that defines the modified SONET ring network including the first parent SONET ring and the sub-tending SONET ring.

12. The system of claim 11, wherein the second routine includes logic to identify a second traffic handling element of the set of traffic handling elements and evaluate the first selected characteristics of the first parent SONET ring with respect to adding the second traffic handling element to the sub-tending SONET ring; and after determining a negative evaluation of at least one of the first selected characteristics of the first parent SONET ring, evaluate second selected characteristics of a second parent SONET ring with respect to adding the second traffic handling element to the second parent SONET ring, and based on a positive evaluation of each of the second selected characteristics of the second parent SONET ring, create a second data model that adds the second traffic handling element to the second parent SONET ring.

13. The system of claim 11, wherein the first selected characteristics of the first parent SONET ring include a physical port switch characteristic, a transport characteristic, and a span of control capacity of an operating and support system characteristic.

14. The system of claim 12, wherein the first traffic handling element is an element of a low data rate subtending ring and wherein the second traffic handling element is an element of another low data rate subtending ring.

15. The method of claim 11, wherein the first parent SONET ring is configured as a first unidirectional path switched ring (UPSR).

16. The system of claim 12, wherein the second parent SONET ring is configured as a second unidirectional path switch ring (UPSR).

17. The system of claim 11, wherein the first parent SONET ring is a high data rate ring.

18. The system of claim 11, wherein a second traffic handling element of the set of traffic handling elements is added to the sub-tending ring.

19. The system of claim 11, wherein a second set of traffic handling elements of a group of parent SONET rings is evaluated with respect to adding at one traffic handling element of the second set of traffic handling elements to a second sub-tending ring.

20. A computer readable storage medium including computer executable code, the computer executable code comprising:
   a first routine to receive a first data file that defines a synchronous optical network (SONET) ring network;
   a second routine responsive to the first routine, the second routine adapted to modify the first data file to create a second data file that defines a modified SONET ring network including at least one sub-tending ring, the second routine including:
      computer executable code, that when executed by a processor, causes the processor to identify a set of traffic handling elements within the SONET ring network;
      computer executable code, that when executed by the processor, causes the processor to, for a first traffic handling element of the set of traffic handling elements, evaluate first selected characteristics of a first parent SONET ring with respect to adding the first traffic handling element to a sub-tending SONET ring;
      computer executable code, that when executed by the processor, causes the processor to, based on a positive evaluation of the first selected characteristics of the first parent SONET ring, create a data model that adds the first traffic handling element to the sub-tending SONET ring of the first parent SONET ring; and
      computer executable code, that when executed by the processor, causes the processor to provide the second data file based on the data model that defines the modified SONET ring network including the first parent SONET ring and the sub-tending SONET ring including a first candidate element.

21. The computer readable storage medium of claim 20, wherein the second routine includes computer executable code, that when executed by the processor, causes the processor to identify a second traffic handling element of the set of traffic handling elements and evaluate the first selected characteristics of the first parent SONET ring with respect to adding the second traffic handling element to the sub-tending SONET ring; and after determining a negative evaluation of at least one of the first selected characteristics of the first parent SONET ring, evaluate second selected characteristics of a second parent SONET ring with respect to adding the second traffic handling element to the second parent SONET ring, and based on a positive evaluation of the second selected characteristics of the second parent SONET ring, create a second data model that adds the second traffic handling element to the second parent SONET ring.

22. The computer readable storage medium of claim 20, wherein the first selected characteristics of the first parent SONET ring include a physical port switch characteristic, a transport characteristic, and a span of control capacity of an operating and support system characteristic.

23. The computer readable storage medium of claim 21, wherein the first traffic handling element is an element of a low data rate subtending ring and wherein the first parent SONET ring is configured as a unidirectional path switch ring (UPSR).

* * * * *